United States Patent Office 2,757,122
Patented July 31, 1956

2,757,122
PROCESS AND INJECTABLE COMPOSITION FOR TREATING POULTRY

Elwin H. Peterson and Herbert G. Luther, Terre Haute, Ind., assignors to Chas. Pfizer & Co., Inc., Brooklyn, N. Y., a corporation of Delaware No Drawing. Application April 22, 1954,
Serial No. 425,027

3 Claims. (Cl. 167—53.1)

This invention is concerned with a medicinal agent which is particularly effective in obtaining prolonged therapeutic action when injected into animals. In particular, it is concerned with a preparation consisting of a tetracycline antibiotic suspended in an oil. The term "tetracycline antibiotic" is meant to include all biologically active forms of the three antibiotics oxytetracycline (available under the trademark "Terramycin"), chlortetracycline (available under the trademark "Aureomycin") and tetracycline (available under the trademark "Tetracyn").

In the treatment of certain infections it is desirable to be able to administer the therapeutic agent at widespread intervals with assurance that the material will remain effective between treatments. Economically, it is difficult to treat animals, particularly smaller, less valuable, animals at frequent (e. g. daily) intervals. These treatments may require the services of an experienced individual, possibly a veterinarian, and such a practice, when thousands of infected animals may be involved, is obviously impractical. A variety of pharmaceutical agents have been administered to humans and to animals by the intramuscular route and in some cases these agents have been used in the form of suspensions in an oil. Often the oil is used to obtain some prolongation of the normal effective period of the drug. Many of these treatments are inefficient and in some cases harmful to animals, and the prolongation of therapeutic effectiveness is not remarkable.

It has now been found that suspensions of tetracycline antibiotics such as amphoteric oxytetracycline, oxytetracycline hydrochloride, tetracycline hydrochloride, amphoteric chlortetracycline, etc. in mineral oils are highly effective therapeutic agents for treatment of certain diseases. In particular, these products have proven outstanding in the treatment of chickens or other foul infected with the disease known as "chronic respiratory disease." The disease has been very difficult to control and tends to spread rapidly throughout large flocks of the birds causing widespread economic loss. Not only are the present compositions of use in treating this infection and other related diseases of animals but the compositions are also useful prophylactically, i. e., to suppress occurrence of such a disease when a flock of birds or other animals is exposed to the condition. The compositions also have value for treatment of such conditions as dry udder with mastitis and by intravaginal administration in bovine metritis. The compositions may also be administered by the intraperitoneal route to such animals as cows, sheep, pigs, etc.

The compositions of the present invention are prepared by suspending finely divided particles of a tetracycline antibiotic in a pharmaceutical grade mineral oil. The suspension may be prepared simply by mixing the two ingredients under sterile conditions and using sterile starting materials. Concentrations ranging from about 10 to about 100 mg. of antibiotic (calculated as the pure anhydrous amphoteric compound) per ml. are quite suitable.

The use of a fatty acid salt of a non-toxic polyvalent metal has proven very useful in the preparation of stable suspensions which settle out but slowly and may be resuspended with ease. A particularly useful compound for this purpose is aluminum stearate. This material is used to the extent of from about .5% to 5% weight based on the total weight of the composition. Other compounds such as calcium stearate, magnesium stearate, calcium oleate, aluminum oleate, calcium myristate, etc. may also be used.

A preferred procedure in preparing the compositions is to mix the mineral oil with the metallic compound and heat the mixture for from 20 minutes to an hour. Moisture is removed during this heating if a temperature sufficiently high is used, i. e., about 90° C. After heating at a somewhat higher temperature, e. g., about 120° C., for a short time the mixture is filtered and cooled. The antibiotic may then be added to the gelled oil and thoroughly blended with it. The product is then placed in suitable sterile vials from which it may be withdrawn just before administration. Administration of the product is made by means of hypodermic syringe and at a suitable site. In the case of the treatment of fowl, the preferred site is subcutaneously on the neck as close to the head as possible. It should be noted that, unlike the preparation of antibiotics used in the past, the present preparations involve the use not of a vegetable oil, but of a mineral oil, and not of intramuscular injection but rather subcutaneous. It is advisable when treating animals with the preparation described above to treat not only infected animals but also uninfected animals in the same group to prevent spread of the infection.

It has been found that the use of the preparations described in this application is unusually effective in maintaining therapeutically active amounts of the antibiotic in the system of the animal treated, particularly chickens, for a period of weeks. The condition of chronic respiratory disease may be very satisfactorily resolved by the use of this material, as long as the animals are treated within a short time after contracting the disease. Generally only a single injection of the infected birds is required.

Despite the manner of injection of the present drug product, i. e., administration subcutaneously and in a mineral oil vehicle that is but slightly absorbed the product seems to attain widespread distribution in the body in a relatively short time. For instance, observation of chickens under ultra-violet light a few hours after administration of the composition showed widespread distribution as indicated by a bluish fluorescence even in the pin feathers. In general, it is necessary to use only one or a few milliliters of the preparation described above to assure proper treatment of chickens or other fowl. Larger amounts may be used for other animals.

The preparations of the present invention show a degree of effectiveness quite unexpected in light of the known properties of the antibiotics and the medium in which they are administered. In cases where a variety of infectious agents are present it has been found that the preparations are often sufficient to cope with these organisms.

Often when antibiotics such as oxytetracycline hydrochloride are injected by the intramuscular or subcutaneous route there is considerable evidence of irritation. It was expected that this might occur with the present preparations. However, despite the long period during which residual material stays at the site of injection, i. e., as much as four weeks or more, there is little or no evidence of irritation of the animal. This feature coupled with the prolonged effectiveness of the present preparations make them particularly desirable as therapeutic agents. It has been noted that the addition of a small volume of water (e. g., one-tenth the volume of oil) results in a rapid absorption of some of the antibiotic and yet the maintenance of an active therapeutic effect for a long period.

The following examples are given by way of illustration and are not to be considered as limitations of this invention. Indeed, as many apparently widely different embodiments of the present invention may be made without departing from the spirit and scope hereof, it is to be understood that this invention is not limited, except as defined in the appended claims.

*Example I*

975 grams of sterile U. S. P. mineral oil was placed in a sterile vessel equipped to be heated. To this was added 25 grams of sterile aluminum tristearate. The mixture was heated at the rate of 2° to 3° per minute until 90° C. was reached. This temperature was maintained from 30 to 40 minutes to remove moisture. The mixture was then heated at approximately the same rate to 120° C. It was maintained at this level for 15 to 20 minutes to stabilize the gel that is formed. The mixture was filtered and allowed to cool. Sterile oxytetracycline hydrochloride weighing 28.5 grams was added to 809.4 grams of the mineral oil and aluminum tristearate mixture. This is sufficient to form 1,000 ml. of mixture. The materials were thoroughly agitated until a homogeneous dispersion was attained. This may be facilitated by passing the mixture through a cooled colloid mill. The mixture was then placed in sterile vials. Multi-dose vials are particularly useful in the treatment of large numbers of animals.

*Example II*

A group of 3,500 Barred Rock pullets which had become severely infected with chronic respiratory disease was divided into smaller groups for treatment. A representative group was isolated as controls. The other groups received 2 ml. or 4 ml. of a preparation prepared as described in Example I above. The material was injected with an automatic syringe of the Cornwall type using a 16 gauge needle and injecting under the skin of the neck of the pullets just behind the head. In all of the treated birds respiratory infection symptoms disappeared by about the seventh day after treatment. All of the untreated birds continued to show definite evidence of respiratory infection. Up to 22 weeks after treatment no relapses had occurred in the treated birds, and egg production was found to be very good for this type of chicken. Apparently, a 2 ml. dosage of this product is adequate.

*Example III*

A group of 500 White Leghorn pullets which had developed symptoms of chronic respiratory disease was treated with subcutaneous injection of 2 ml. of a suspension of oxytetracycline hydrochloride in mineral oil prepared as described in Example I above. Symptoms of respiratory distress disappeared in from five to eight days after the treatment had been made. This group of chickens was just coming into egg production and the performance of the flock after recovery from the respiratory disease was found to be completely satisfactory.

*Example IV*

The preparation described in Example I was repeated with the use of tetracycline hydrochloride as the antibiotic. A highly effective therapeutic agent was obtained.

*Example V*

The preparation of Example I was repeated using amphoteric chlortetracycline as the antibiotic. The preparation proved very effective in treating infected poultry.

*Example VI*

25 ml. of the preparation described in Example I was administered to one quarter of the dry mastitic udder of a cow. Serum samples from the udder were checked over a period of about one month. At the end of this period a high level of the antibiotic was still present.

What is claimed is:

1. A parenterally injectable composition for treating poultry which comprises mineral oil gelled with from about .5% to 5% by weight of aluminum stearate and from about 10 to 100 mg. of oxytetracycline hydrochloride per ml.

2. A process for the treatment of chronic respiratory infection in fowl which comprises treating the animals by subcutaneous injection of a mineral oil suspension of a tetracycline antibiotic.

3. A parenterally injectable composition for treating poultry which comprises from about 10 to 100 mg. per ml. of a tetracycline antibiotic suspended in mineral oil gelled with a salt of a fatty acid selected from the class consisting of stearic, oleic and myristic with a metal selected from the class consisting of aluminum, calcium and magnesium.

References Cited in the file of this patent

UNITED STATES PATENTS

| | | |
|---|---|---|
| 2,327,564 | Scherer | Aug. 24, 1943 |
| 2,507,193 | Buckwalter | May 9, 1950 |
| 2,625,158 | Lee | Jan. 13, 1953 |
| 2,640,801 | Burkhart | June 2, 1953 |

FOREIGN PATENTS

| | | |
|---|---|---|
| 686,693 | Great Britain | Jan. 28, 1953 |

OTHER REFERENCES

Gross et al.: "Effect of Drugs on the Agents Causing Infectious Sinusitis of Turkeys and Chronic Respiratory Disease (Air-Sac Infection) of Chickens." Poultry Science, March 1953, pages 260–263.

Fischer: "Unguentum Aluminii Steratis," Ohio State Med. Jour., August 1942, page 756.